(12) United States Patent
Lee et al.

(10) Patent No.: US 10,427,353 B2
(45) Date of Patent: Oct. 1, 2019

(54) ADDITIVE MANUFACTURING USING STIMULI-RESPONSIVE HIGH-PERFORMANCE POLYMERS

(71) Applicants: Chang-Uk Lee, Seattle, WA (US); Adam Edward Goetz, Niantic, CT (US); Yosuke Ashikari, Seattle, WA (US); Andrew Jackson Boydston, Seattle, WA (US); Mark A. Ganter, Edmonds, WA (US); Duane William Storti, Seattle, WA (US)

(72) Inventors: Chang-Uk Lee, Seattle, WA (US); Adam Edward Goetz, Niantic, CT (US); Yosuke Ashikari, Seattle, WA (US); Andrew Jackson Boydston, Seattle, WA (US); Mark A. Ganter, Edmonds, WA (US); Duane William Storti, Seattle, WA (US)

(73) Assignees: Ricoh Company, Ltd., Tokyo (JP); University of Washington, Seattle, WA (US)

(*) Notice: Subject to any disclaimer, the term of this patent is extended or adjusted under 35 U.S.C. 154(b) by 0 days.

(21) Appl. No.: 15/452,533

(22) Filed: Mar. 7, 2017

(65) Prior Publication Data
US 2017/0326790 A1    Nov. 16, 2017

Related U.S. Application Data

(60) Provisional application No. 62/336,510, filed on May 13, 2016.

(51) Int. Cl.
*B29C 64/165* (2017.01)
*B33Y 80/00* (2015.01)
(Continued)

(52) U.S. Cl.
CPC ........... *B29C 64/165* (2017.08); *B33Y 10/00* (2014.12); *B33Y 70/00* (2014.12); *B33Y 80/00* (2014.12);
(Continued)

(58) Field of Classification Search
CPC ........... C08L 61/16; B29K 2995/0077; B29K 2079/08; B29K 2071/00; B33Y 70/00;
(Continued)

(56) References Cited

U.S. PATENT DOCUMENTS

| 4,108,837 A | 8/1978 | Johnson et al. |
| 4,175,175 A | 11/1979 | Johnson et al. |

(Continued)

FOREIGN PATENT DOCUMENTS

| EP | 3064340 A2 | 9/2016 |
| EP | 3210763 A1 | 8/2017 |

(Continued)

OTHER PUBLICATIONS

Office Action for JP Application No. 2018-036249,9,2019, dated Apr. 8 pgs. (with translation).

*Primary Examiner* — Nahida Sultana
(74) *Attorney, Agent, or Firm* — Patent Law Works LLP

(57) ABSTRACT

The present invention provides high performance polymer (HPP) compositions, methods, processes, and systems for the manufacture of three-dimensional articles made of polymers using molding or 3D printing. The HPP compositions comprise a first HPP dissolved in a solvent and a second HPP present as a solid having particular particle size.

17 Claims, 7 Drawing Sheets

(51) Int. Cl.
*B33Y 10/00* (2015.01)
*B33Y 70/00* (2015.01)
*B29K 71/00* (2006.01)
*B29K 105/00* (2006.01)

(52) U.S. Cl.
CPC .. *B29K 2071/00* (2013.01); *B29K 2105/0014* (2013.01)

(58) Field of Classification Search
CPC ............ B33Y 10/00; B29C 2035/0827; B29C 35/0805
See application file for complete search history.

(56) References Cited

U.S. PATENT DOCUMENTS

| | | | |
|---|---|---|---|
| 4,176,222 A | 11/1979 | Cinderey et al. | |
| 5,121,329 A | 6/1992 | Crump | |
| 5,911,880 A | 6/1999 | Klein et al. | |
| 6,228,970 B1 | 5/2001 | Savariar | |
| 6,375,874 B1 | 4/2002 | Russell et al. | |
| 6,416,850 B1 | 7/2002 | Bredt et al. | |
| 6,566,484 B2 | 5/2003 | Gharda et al. | |
| 2002/0017743 A1* | 2/2002 | Priedeman, Jr. | B29C 41/36 264/464 |
| 2003/0130476 A1 | 7/2003 | Kemmish et al. | |
| 2006/0208388 A1* | 9/2006 | Bredt | B33Y 70/00 264/123 |
| 2007/0267766 A1* | 11/2007 | Hesse | B29B 9/14 264/6 |
| 2008/0258330 A1* | 10/2008 | Muller | C08J 3/12 264/113 |
| 2009/0295042 A1* | 12/2009 | Pfister | C08J 3/28 264/497 |
| 2011/0221100 A1* | 9/2011 | Wesselky | B05B 3/1092 264/401 |
| 2013/0170171 A1* | 7/2013 | Wicker | H01L 21/4846 361/809 |
| 2013/0216836 A1* | 8/2013 | Grebe | B22F 3/1055 428/411.1 |
| 2013/0217838 A1* | 8/2013 | DeFelice | B29C 67/04 525/471 |
| 2014/0197579 A1* | 7/2014 | Meyer | B29C 67/0077 264/497 |
| 2014/0232035 A1* | 8/2014 | Bheda | B29C 64/106 264/148 |
| 2015/0202826 A1* | 7/2015 | Paternoster | B33Y 10/00 428/474.7 |
| 2017/0113411 A1* | 4/2017 | Watanabe | B33Y 10/00 |
| 2017/0157041 A1* | 6/2017 | Goldner | A61K 9/0056 |
| 2017/0282455 A1* | 10/2017 | DeFelice | B33Y 10/00 |
| 2017/0326790 A1* | 11/2017 | Lee | B29C 64/165 |
| 2017/0326816 A1* | 11/2017 | Seepersad | B29C 64/291 |
| 2018/0001520 A1* | 1/2018 | Saito | B29C 39/02 |
| 2018/0022043 A1* | 1/2018 | Keoshkerian | B33Y 10/00 |
| 2018/0354191 A1* | 12/2018 | Nauka | B29C 35/0805 |

FOREIGN PATENT DOCUMENTS

| | | |
|---|---|---|
| GB | 1264900 A | 2/1972 |
| JP | 2016-159635 | 9/2016 |

* cited by examiner

ADDITIVE MANUFACTURING USING STIMULI-RESPONSIVE HIGH-PERFORMANCE POLYMERS

CROSS-REFERENCE TO RELATED APPLICATIONS

This application claims the benefit U.S. Provisional Application No. 62/336,510 filed May 13, 2016, entitled "Toward Room-Temperature Additive Manufacturing with High Performance Polymers," which is incorporated herein by reference in its entirety.

FIELD OF INVENTION

The present invention relates to compositions of high performance polymers, and methods and apparatus for creating three-dimensional articles using the compositions.

BACKGROUND

Three-dimensional (3D) printing refers to processes that create 3D objects based upon digital 3D object models and a materials dispenser. In 3D printing, a dispenser moves in at least 2-dimensions and dispenses material according to a determined print pattern. To build a 3D object, a platform that holds the object being printed is adjusted such that the dispenser is able to apply many layers of material, and printing many layers of material, one layer at a time, may print a 3D object.

A conventionally known 3D printing process is the UV ink-jet process. It is a three-stage process of applying a material, printing a UV-curable liquid, and finally hardened using a UV source. These steps are repeated layer-by-layer. In conventional 3D printing, disclosed in U.S. Pat. Nos. 6,375,874 and 6,416,850, generally an inkjet type print head delivers a liquid or a colloidal binder material to layers of a powdered build material. The printing technique involves applying a layer of a powdered build material to a surface typically using a roller. After the build material is applied to the surface, the print head delivers the liquid binder to predetermined areas of the layer of material. The binder infiltrates the material and reacts with the powder, causing the layer to solidify in the printed areas by, for example, activating an adhesive in the powder. The binder also penetrates into the underlying layers, producing interlayer bonding. After the first cross-sectional portion is formed, the previous steps are repeated, building successive cross-sectional portions until the final object is formed.

The oldest and the best-known laser-based 3D printing process is stereolithography (SLA). In this process, a liquid composition of a radiation-curable polymer is hardened layer-by-layer by using a laser. A similar process is Selective Laser Sintering (SLS) in which a thermoplastic or a sinterable metal is sintered selectively layer-by-layer by a laser to form the 3D object.

U.S. Pat. No. 5,121,329 describes the fused deposition modeling (FDM) process for the production of three-dimensional objects using an extrusion-based, digital manufacturing system. There are also other known processes that are substantially analogous with slight differences, for example fused filament fabrication (FFF), melt extrusion manufacturing (MEM) or selective deposition modeling (SDM).

In the FDM method, two different polymer filaments are melted in a nozzle and are printed selectively. One of the materials involves a support material, which is needed only at locations above which an overhanging part of the 3D object is printed and requires support during the subsequent printing procedure. The support material can be removed subsequently, e.g. via dissolution in acids, bases or water. The other material (the build material) forms the actual 3D object. Here again, the print is generally achieved layer-by-layer.

SUMMARY

The present invention provides compositions, methods, processes, and systems for manufacture of three-dimensional articles composed of polymers, such as high performance polymers (HPP).

Disclosed are compositions of HPP. The compositions comprise a first HPP dissolved in a solvent, and a second HPP as a solid.

In one aspect, a method for printing a three-dimensional article is provided. The disclosed method comprises depositing a high-performance polymer (HPP) composition comprising a first HPP dissolved in a solvent and a second HPP as a solid, exposing the HPP composition to a stimulus to form a polymer layer of the three-dimensional article, and repeating the steps to manufacture remainder of the three-dimensional article.

In another aspect, disclosed are methods for manufacturing a three-dimensional article, the method comprising depositing the powder of first HPP on a build plate to form a powder bed, printing a solution comprising a second HPP dissolved in a solvent at selected locations on the powder bed, exposing the printed solution to a stimulus to form a polymer layer of the three-dimensional article, and repeating the steps to manufacture remainder of the three-dimensional article.

In another aspect, a three-dimensional article made by the process of printing a high-performance polymer (HPP) composition comprising a first HPP dissolved in a solvent and a second HPP as a solid, exposing the HPP composition to a stimulus to form a polymer layer of the three-dimensional article, repeating the steps to form a remainder of the three-dimensional article, and curing the article for less than about 1 minute.

These and other aspects of the present invention will become evident upon reference to the following detailed description.

BRIEF DESCRIPTION OF DRAWINGS

In FIG. 1A, the roller 5, deposits a high performance polymer (HPP) as a powder from a powder bed reservoir 2 to the powder bed 1. The build plate 3 can move in an up and down direction as needed. The head 4 prints a HPP composition on the powder bed 1. FIG. 1B shows a single layer being patterned. In FIG. 1C, the roller 5, deposits HPP from a powder bed reservoir 2 to the powder bed 1. FIG. 1D shows that the HPP has formed a new powder bed layer, and the process can be repeated to print a three-dimensional article layer by layer.

FIG. 2A shows the paste. FIG. 2B shows the paste placed in a rectangular mold. FIG. 2C shows the 3D rectangular product after it was removed from the mold. FIG. 2D shows the 3D rectangular product after it was cured.

FIG. 3A shows that the E' value changes after the first soaking and baking cycle, but does not change after additional soaking and baking cycle. FIG. 3B shows that the soaking and baking cycles do not change the glass transition temperature (Tg).

FIG. 4A shows a 3D log-like structure manufactured by syringe printing. FIG. 4B shows the letter "W" created by syringe printing.

DETAILED DESCRIPTION

I. Definitions

Figure 1A:
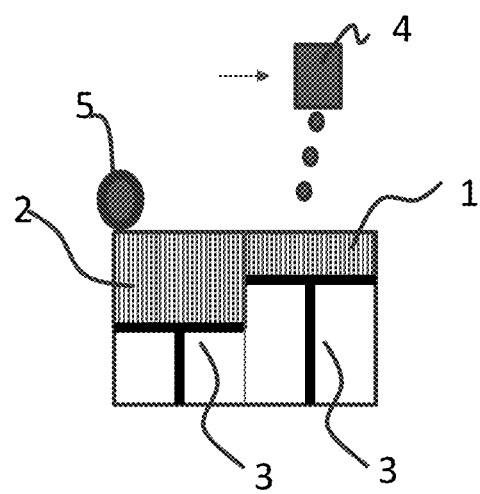
FIG. 1A-1D illustrates a method of printing a three-dimensional article layer by layer as disclosed herein.

Unless otherwise stated, the following terms used in this application, including the specification and claims, have the definitions given below. It must be noted that, as used in the specification and the appended claims, the singular forms "a," "an" and "the" include plural referents unless the context clearly dictates otherwise.

As used herein, a "build plate" refers to a solid surface made from material such as glass, metal, ceramic, plastic, polymer, and the like.

The term "optional" or "optionally" means that the subsequently described event or circumstance may or may not occur, and that the description includes instances where the event or circumstance occurs and instances where it does not.

All publications, patents and patent applications cited herein, whether supra or infra, are hereby incorporated by reference in their entirety.

II. Overview

Disclosed are methods for additive manufacturing of high performance polymer (HPPs) that is based upon the use of HPP solutions to bind and fuse insoluble particles of HPPs and methods for manufacturing articles made of polymers using three-dimensional printing. The disclosed methods have the advantage of being able to rapidly print three-dimensional articles that have better mechanical properties, better thermal properties, and the like. The disclosed methods are more flexible than other art methods in that they allow the three-dimensional article to be built around another, such as a conducting wire to make a circuit. In addition, the manufactured articles have molecular structural features and physical properties that match those of the final polymers, such as Kapton® polymers, polyketone polymers, and polyethersulfone polymers.

In one application, soluble polyether ether ketone (PEEK) polymers can be prepared and dissolved in organic solvents such as toluene, carvone, THF, spearmint oil, α-terpinene, limonene, α-pinene, fenchone, benzene, and combinations thereof. The solutions can be used to bind insoluble particles (10-50 micron diameters) of a HPP, such as PEEK, or any other polymer. The resulting mixture can form a paste that can be molded or extruded, and then sintered. Molding prior to sintering provided a means to generate parts from HPPs that were cast from non-reconfigurable designs. Material extrusion provided a means to generate 3D objects from digitally reconfigurable designs using material extrusion printers. The HPP solutions can also be formulated to have viscosities ranging from 1-50 cP, allowing for ink jet printing. The solutions of HPPs can be printed by ink jetting into beds of insoluble HPP powder particles, thus enabling additive manufacturing of HPP-based parts by means of binder jetting at room temperature. The final printed parts can be cured, such as sintering, to provide the final product. The final product thus obtained has increased mechanical strength, tensile modulus, and elastic modulus in comparison with the green body prints.

III. Polymers

The three-dimensional form can be made from one or more materials. In certain embodiments, the three-dimensional form can comprise polymers. Any type of polymer can be used to form the three-dimensional form, and the polymer can be selected such that the three-dimensional form has the desired properties. Thus, the polymer can be polyimides, polyketones, reduced form of polyketones, polyethersulfones, and the like.

Polyketone Polymers

In one aspect, the three-dimensional form can be made from a final polymer that is a polyketone, such as polyetheretherketone (PEEK), polyaryletherketone (PAEK), polyetherketone (PEK), polyetherketoneketone (PEKK) polyetheretheretherketone (PEEEK), polyetheretherketoneketone (PEEKK), polyetherketoneetheretherketone (PEKEKK), or polyetherketoneketoneketone (PEKKK). If the polyketone polymer is PEEK, it typically can be obtained by reacting a substantially equimolar mixture of at least one aromatic dihydroxy compound and at least one dihalobenzoid compound or at least one halophenol compound, as shown below:

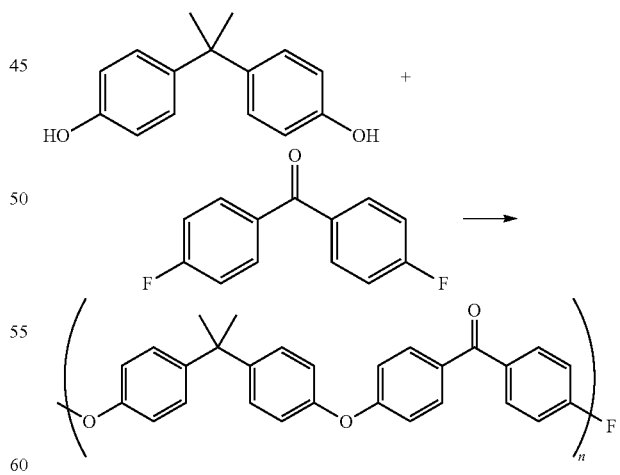

Non-limiting examples of aromatic dihydroxy compounds useful in such a process are hydroquinone, 4,4'-dihydroxybiphenyl and 4,4'-dihydroxybenzophenone. Exemplary suitable aromatic dihydroxy compounds include bis(hydroxyaryl)alkanes such as bis(4-hydroxyphenyl) methane, bis(2-methyl-4-hydroxyphenyl)methane, bis(3- methyl-4-hydroxyphenyl)methane, 1,1-bis(4'-hydroxyphenyl)ethane, 1,2-bis(4'-hydroxyphenyl)ethane, bis(4-hydroxyphenyl)phenylmethane, bis(4-hydroxyphenyl)diphenylmethane, bis(4-hydroxyphenyl)-1-naphthylethane, 1,1-bis(4'-hydroxyphenyl)-1-phenylethane, 1,3-bis(4'-hydroxyphenyl)-1,1-dimethylpropane, 2,2-bis(4'-hydroxyphenyl)propane ["Bisphenol A"], 2-(4'-hydroxyphenyl)-2-(3''-hydroxyphenyl)propane, 1,1-bis(4'-hydroxyphenyl)-2-methylpropane, 2,2-bis(4'-hydroxyphenyl)butane, 1,1-bis(4'-hydroxyphenyl)-3-methylbutane, 2,2-bis(4'-hydroxyphenyl)pentane, 2,2-bis(4'-hydroxyphenyl)-4-methylpentane, 2,2-bis(4'-hydroxyphenyl)hexane, 4,4-bis(4'-hydroxyphenyl)heptane, 2,2-bis(4'-hydroxyphenyl)octane, 2,2-bis(4'-hydroxyphenyl)nonane, bis(3,5-dimethyl-4-hydroxyphenyl)methane, 2,2-bis(3'-methyl-4'-hydroxyphenyl)propane, 2,2-bis(3'-ethyl-4'-hydroxyphenyl)propane, 2,2-bis(3'-n-propyl-4'-hydroxyphenyl)propane, 2,2-bis(3'-isopropyl-4'-hydroxyphenyl)propane, 2,2-bis(3'-sec-butyl-4'-hydroxyphenyl)propane, 2,2-bis(3'-tert-butyl-4'-hydroxyphenyl)propane, 2,2-bis(3'-cyclohexyl-4'-hydroxyphenyl)propane, 2,2-bis(3'-allyl-4'-hydroxyphenyl)propane, 2,2-bis(3'-methoxy-4'-hydroxyphenyl)propane, 2,2-bis(3',5'-dimethyl-4'-hydroxyphenyl)propane, 2,2-bis(2',3',5',6'-tetramethyl-4'-hydroxyphenyl)propane, 2,2-bis(3'-chloro-4'-hydroxyphenyl)propane, 2,2-bis(3',5'-dichloro-4'-hydroxyphenyl)propane, 2,2-bis(3'-bromo-4'-hydroxyphenyl)propane, 2,2-bis(3',5'-dibromo-4'-hydroxyphenyl)propane, 2,2-bis(2',6'-dibromo-3',5'-dimethyl-4'-hydroxyphenyl)propane, bis(4-hydroxyphenyl)cyanomethane, 3,3-bis(4'-hydroxyphenyl)-1-cyanobutane, 2,2-bis(4'-hydroxyphenyl)hexafluoropropane and the like.

Non-limiting examples of dihalobenzoid compounds useful in such a process are 4,4'-difluorobenzophenone, 4,4'-dichlorobenzophenone, 4-chloro-4'-fluorobenzophenone, and the like; non limitative examples of halophenols compounds useful in such a process are 4-(4-chlorobenzoyl)phenol and (4-fluorobenzoyl)phenol. Accordingly, PEEK polymers can be produced by the nucleophilic process as described in, for example, U.S. Pat. No. 4,176,222, or by electrophilically polymerizing the starting materials as described in U.S. Pat. No. 6,566,484. Other poly(aryl ether ketone)s can be produced by starting from other monomers such as those described in U.S. Patent Application No. 2003/0130476. If the polyketone polymer is PAEK, PEK, PEKK, PEEEK, PEEKK, PEKEKK, or PEKKK, they can be synthesized using known methods. Alternatively and equivalently, a commercially available PEEK, PAEK, PEK, PEKK, PEEEK, PEEKK, PEKEKK, or PEKKK polymer can be used.

The aromatic dihydroxy compounds can comprise one or more alkene groups, one or more thiol groups, or one or more epoxide groups that can participate in photo-initiate thiol-ene polymerization. Exemplary structures are shown below:

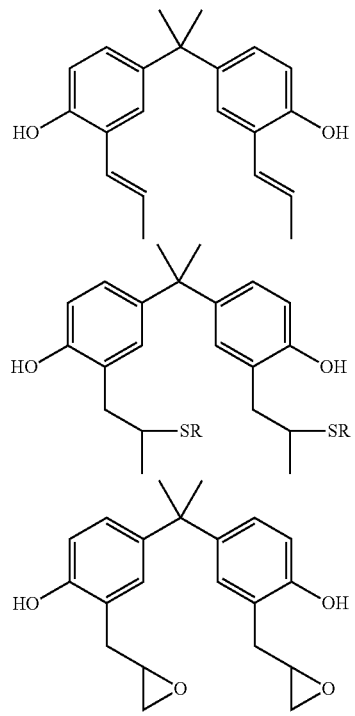

It should be appreciated that all compounds having one or more alkene functional groups are suitable in conjunction with the teachings presented herein. However, it is generally preferred that the polyalkene or alkene compound has at least two alkene groups. The alkene groups may be provided by allyls, allyl ethers, vinyl ethers, acrylates. For example, the olefin moiety can be selected from any suitable ethylenically unsaturated group such as allyls, allyl ethers, vinyl, vinyl ether, acetyl, acrylate, methacrylate, maleimide, norbornene or other monomers containing a carbon-carbon double bond, or combinations thereof. For example, the monomer can be 2,2'-diallylbisphenol-A, O,O'-diallylbisphenol A, 3,3'-diallylbisphenol A, and bisphenol A bisallyl carbonate. Other allylic monomers include diallyl phthalate, diethylene glycol bisallyl carbonate, and diallyl biphenate.

A polyketone polymer can be obtained by reacting a mixture of at least one monomer having an alkene group, at least one aromatic dihydroxy compound and at least one dihalobenzoid compound or at least one halophenol compound, as shown below:

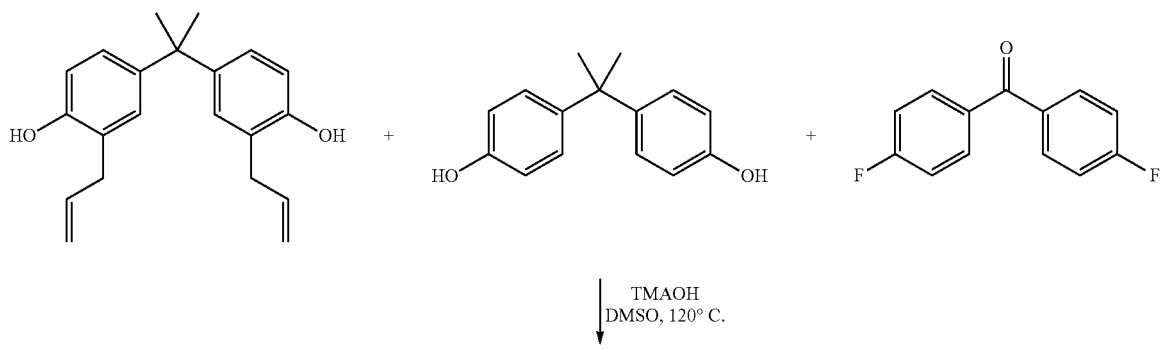

-continued

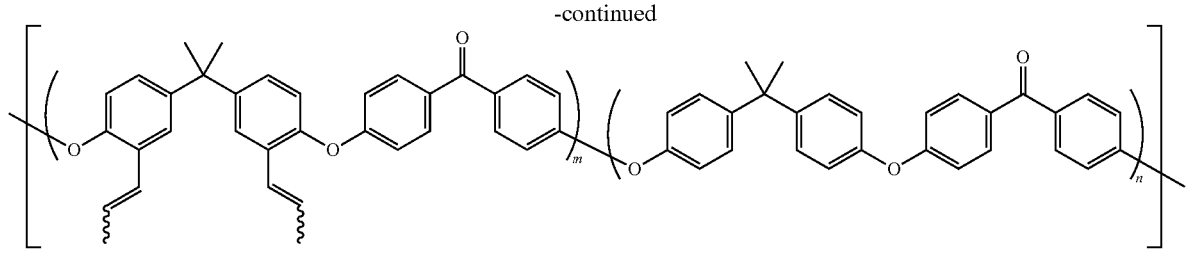

The three monomers can be arranged in alternating sequence or in a random order as blocks of monomers, and can be in any ratio. Preferably, the ketone monomer is about 50% of the reaction mixture. Thus, the reaction mixture can contain a substantially equimolar mixture of the dihydroxy compounds and the dihalobenzoid compound. Thus, the ratio of the monomer having the alkene group to the aromatic dihydroxy monomer can be 100:0, 95:5, 90:10, 75:25, 50:50, 25:75, 10:90, 5:95, 0:100, or any other ratio in between.

The HPP can be a ketal of the polyketone polymer, where one or more of the carbonyl group (>C=O) can be converted to a diether (>C(OR)$_2$), where each R can be independently selected to be alkyl, alkylene, alkenylene, aryl, or combination thereof. The ketal can be produced by reaction of the carbonyl group with, for example, an alcohol, such as a primary alcohol, a secondary alcohol, a tertiary alcohol, or a combination thereof. The ketal can be acyclic, cyclic, or spiro cyclic ketal. The HPP can also be a thioketal, a dithioketal, or a hemiketal of the polyketone polymer. The ketal, hemiketal, thioketal or dithioketal can be obtained by reacting the dihalobenzoid compound with the alcohol or with a thiol, as shown below:

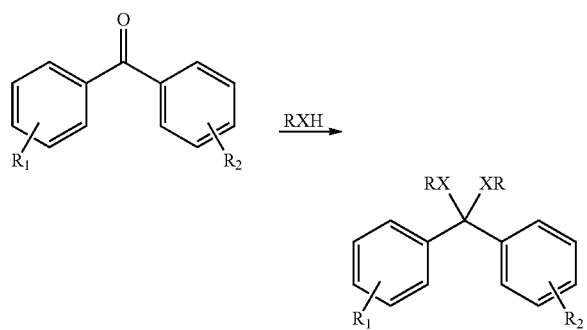

where X can be a hetero atom, such as oxygen or sulfur. Examples of suitable monofunctional alcohols include methanol, ethanol, various linear and branched isomers of propanol, butanol, pentanol, hexanol, octanol, nonanol, decanol, undecanol, dodecanol, tetradecanol, cetyl alcohol, and stearyl alcohol; cycloalkyl alcohols such as cyclohexanol, cyclooctanol, norbornyl alcohol, and the like; alkynyl alcohols such as ethynyl alcohol, 3-methylpent-1-yn-3-ol, tetradec-9-ynol, and the like; aryl and alkaryl alcohols such as phenol, benzyl alcohol, toluoyl, xylyl alcohol, 5-phenylpentanol, and the like; and alcohols having various functional groups, for example 1,1,1-trichloro-2-methyl-2-propanol, 5-fluoro-1-pentanol, 5-amino-1-pentanol, 5-benzyloxy-1-pentanol, 5-methoxy-1-pentanol, 3-nitro-2-pentanol, 4-methylthio-1-butanol, 6-hydroxyhexanoic acid, lactamide, and the like. In some embodiments, the ketal can be by a cyclic ketal formed by the reaction of polyols with the carbonyl moieties. Examples of suitable polyols include 1,2-ethanediol (ethylene glycol), 1,2-propanediol (propylene glycol), 1,3-propanediol, 1,2,3-propanetriol (glycerol), diglycerol (a mixture of glycerol dimers coupled at primary and secondary hydroxyl moieties), 2,2-dimethyl-1,3-propanediol (neopentyl glycol), 3-mercaptopropane-1,2-diol (thioglycerol), dithiothreitol, 1,1,1-trimethylolpropane, 1,2-butanediol, 1,3-butanediol, pentaerythritol, cyclohexane-1,2-diol, 1,4-dioxane-2,3-diol, and the like.

The ketal, hemiketal, thioketal or dithioketal of polyketone can then be used as the HPP for performing the polymerization reaction wherein the final polymer is produced. Alternatively, the polymer can first be obtained, and at least one of the carbonyl groups can then be converted to a ketal, hemiketal, thioketal or dithioketal to provide the HPP.

When the HPP is a ketal of PEEK, the carbonyl group of the ketone moiety can be readily regenerated by hydrolysis using water, acidic solution, heat, light, base catalysis, catalytic hydrogenation, or a combination thereof. For example, the ketal of PEEK can be converted to the final polyketone polymer using a stimulus that is a Brønsted acid or a Lewis acid based reagent. Thus, for example, dilute solution of hydrochloric acid, hydrobromic acid, perchloric acid, acetic acid, sulfuric acid, arylsulfonic acids and hydrates thereof, such as p-toluenesulfonic acid monohydrate, phosphoric acid or orthophosphoric acid, polyphosphoric acid, sulfamic acid, and the like can be used as the stimulus. In other embodiments, the acid catalysts employed are aprotic, also referred to as Lewis Acids. Such Lewis acid catalysts can include, for example, titanium tetrachloride, aluminum trichloride, boron trifluoride, stannic chloride, and the like. In some embodiments, more than one type of acid catalyst is used; thus, blends of one or more of the acids mentioned above may be used in a mixture to catalyze the reactions.

The polyketone polymer can have a molecular weight such that the three-dimensional article has high strength and is not brittle. The polyketone preferably have an average molecular weight from 1,000 to 400,000, more preferably from 10,000 to 350,000, still more preferably from 15,000 to 100,000. Thus, the polyketone can have an average molecular weight of about 5,000, 7,000, 10,000, 15,000, 17,000, 19,000, 20,000, 22,000, 23,000, 24,000, 25,000, and the like.

In another aspect, the polyketone has an average molecular weight (in Daltons) where the molecular weight distribution is in a range of about 500 to about 20,000, preferably a range of about 1,000 to about 10,000, or more preferably, a range of about 3,000 to about 7,000. Thus, the polyketone can have a molecular weight distribution between about 3,000 to about 5,000, about 10,000 to about 13,000, about 15,000 to about 18,000, about 23,000 to about 27,000, and the like.

The polyketone HPP can be converted to the final polyketone polymer by exposing it to a stimulus, such as, heat, light, electrolysis, metal catalyst, or a chemical oxidant, as is known in the art. The light can be ultraviolet, infrared, visible, or combination thereof. The light sources are conventionally well known in the art, and include a low-pressure, a medium-pressure or a high-pressure mercury lamp, and a metal halide lamp, a xenon lamp, a cathode tube, a LED, and the like. In one embodiment, the application of light can be under neutral conditions, optionally in the presence of a catalyst, such as iodine, indium(III) trifluoromethane-sulfonate or tetrakis(3,5-trifluoromethylphenyl) borate, a Lewis acid catalyst, and the like.

In one aspect, the three-dimensional article made from a final polymer that is a polyimide polymer. The polyimide polymer can be selected based on its properties, such as high adhesion properties, high strength, mechanical properties, heat resistance, chemical resistance, electrical insulation, and the like. The polyimide polymers can be prepared by imidization of the poly(amic acid), using methods known in the art. Thus, for example, the poly(amic acid) can be exposed to a stimulus that is heat or a chemical imidization reactant. Alternatively, and equivalently, commercially available polyimide polymer can be used.

In another aspect, the three dimensional object can be made from a final polymer that is a polysulfone polymer. Polysulfones, as used herein, refers to a family of polymers which contain the subunit -aryl-$SO_2$-aryl-, more specifically -aryl-$SO_2$-aryl-O—, as shown below:

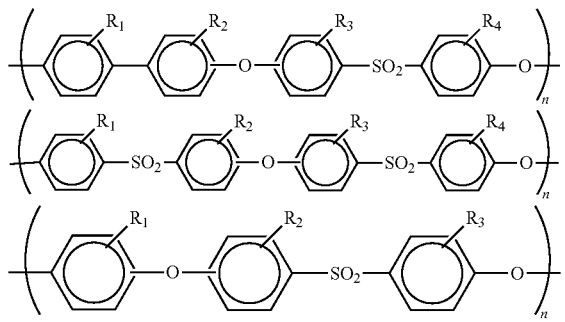

where $R_1$, $R_2$, $R_3$, $R_4$ are independently selected to be an alkyl, an alkylene, an aryl, or a halogen. Aromatic polyethersulfones can be prepared, for example, by the reaction of dialkali metal salts of diphenols with dihalodiarylsulfones in a solvent. The dialkali salts of diphenols may also be produced in situ or may be produced in a separate reaction. The diphenols can be any one as described above or known in the art. The polysufones includes a polymer of 4-[2-(4-hydroxyphenyl)propan2-yl]phenol and 4-(4-hydroxyphenyl)sulfonylphenol, commonly known as polysulfone, and a polymer of benzene-1,4-diol and 4-(4-hydroxyphenyl)sulfonylphenol commonly known as polyethersulfone. Polyethersulfone (PES) is also known as polyarylethersulfone (PAES) and/or polyphenylsulfone (PPSU). Another suitable polysulfone is a copolymer of 4-(4-hydroxyphenyl)phenol and 4-(4-hydroxyphenyl)sulfonylphenol, also known as polyphenylsulfone. Other exemplary polysulfones are described in U.S. Pat. No. 5,911,880.

Polyethersulfones can be produced by a variety of methods. For example, U.S. Pat. Nos. 4,108,837 and 4,175,175 describe the preparation of polyarylethers and in particular polyarylethersulfones. U.S. Pat. No. 6,228,970 describes the preparation polyarylethersulfones with improved polydispersity and lower amounts of oligomers. British patent GB 1,264,900 teaches a process for production of a polyethersulfone comprising structural units derived from 4,4'-biphenol, bisphenol-A (4,4'-isopropylidenediphenol), and 4,4'-dichlorodiphenylsulfone. Thus, the polysulfone polymers can be synthesized using known methods. Alternatively, and equivalently, commercially available polysulfone polymers can be used.

IV. Solid High Performance Polymers

A solid powder of any high performance polymer (HPP) can be obtained as a solid by removal of the solvent. The HPP can be further treated to provide a powder having the desired particle size distribution or particle shape. The particle size of the solid HPP can be reduced by utilizing mechanical devices, such as, for example, mortar and pestle, milling, application of ultrasonic energy, by spray drying, or by shearing the particles in a liquid flowing at high velocity in a restricted passage. For example, the solid HPP can be ground using a mortar, it can be milled, it can micronized, or it can be nanonized to provide HPP powder with the desired average particle size. Thus, the solid HPP can be milled to provide poly(amic acid) powder having an average particle size of about 5 microns to about 250 microns, or about 10 microns to about 100 microns, and the like. Thus, the HPP powder can have an average particle size of about 5 microns to about 25 microns, about 20 microns to about 60 microns, about 10 microns to about 20 microns, about 20 microns to about 30 microns, about 40 microns to about 50 microns, or about 25 microns to about 50 microns.

HPP powder having an average particle size of between 10 nm and 10 microns are useful in the compositions described herein. In some aspects, the particles can be nanoparticles having diameters of about 1 nm to about 1000 nm, from about 10 nm to about 200 nm, and from about 50 nm to about 150 nm. In another aspect, the particles can have a size range from about 500 nm to about 600 nm.

The particles can have any shape but are generally spherical in shape. Suitable particles can be spheres, spheroids, flat, plate-shaped, tubes, cubes, cuboids, ovals, ellipses, cylinders, cones, or pyramids. The particles can also have random or ill-defined shapes or can be amorphous.

Preferably, the method used to form the powder produces a monodisperse distribution of particles. However, methods producing polydisperse particle size distributions can be used. If the method does not produce particles having a monodisperse size distribution, the particles can be separated following particle formation to produce a plurality of particles having the desired size range and distribution. Alternatively, and equivalently, commercially available HPP can be used in the disclosed methods.

V. HPP Compositions

The HPP compositions comprise a first HPP dissolved in a solvent and a second HPP that is insoluble in the solvent and is initially present as solid material. The first HPP and the second HPP can be the same polymer or can be different, and can be polyimides, polyketones, reduced forms of polyketones, polyethersulfones, or combinations thereof.

The polyketone polymer or any other high performance polymer (HPP) can be dissolved in a solvent. The solvent used in carrying out the disclosed methods is preferably an inert organic solvent that is polar, which can have a high boiling point, and in which the HPP is soluble, but the final polymer is insoluble or has lower solubility. Examples of the solvent that can be used include solvents having a nitrogen atom in the molecule such as N,N-dimethylacetamide, N,N-diethylacetamide, N,N-dimethylformamide, N,N-diethylformamide, N-methyl-2-pyrrolidone, 2-pyrolydon, N-methyl-2-pyrolydon, 1,3-dimethyl-2-imidazolidinone, and N-methylcaprolactam; solvents having a sulfur atom in the molecule such as dimethyl sulfoxide, diethyl sulfoxide, dimethyl sulfone, diethyl sulfone, and hexamethyl sulfolamide, tetramethylene sulfone; solvents which are phenols such as cresol, phenol, and xylenol; solvents having an oxygen atom in the molecule such as diethylene glycol dimethyl ether (diglyme), triethylene glycol dimethyl ether (triglyme), and tetraglyme; aromatic solvents such as benzene, toluene, ethylbenzene, chlorobenzene, o-xylene, m-xylene, p-xylene, mesitylene, i-propylbenzene, 1-chlorobenzene, 2-chlorotoluene, 3-chlorotoluene, 4-chlorotoluene, t-butylbenzene, n-butylbenzene, i-butylbenzene, s-butylbenzene, 1,2-dichlorobenzene, 1,3-dichlorobenzene, 1,4-dichlorobenzene, 1,3-diisopropylbenzene, 1,4-diisopropylbenzene, 1,2-difluorobenzene, 1,2,4-trichlorobenzene, 3-methylanisole, 3-chloroanisole, 3-phenoxytoluene, diphenyl ether, anisole, and mixtures thereof and other solvents such as acetone, dimethylimidazoline, methanol, ethanol, ethylene glycol, dioxane, tetrahydrofuran, pyridine, and tetramethylurea. In addition, amido based solvents can be used, such as $R_3O—(CH_2)_nC(O)NR_1R_2$, where $R_1$, $R_2$, and $R_3$ can be independently selected to be H or lower alkyl, such as methy (Me), ethyl (Et), n-propyl (n-Pr), iso-propyl (i-Pr), n-buty (n-Bu), s-butyl (s-Bu), tert-butyl (t-Bu), and the like. These may be used in combination of two or more. In one aspect, the solvent can be N-methyl-2-pyrrolidone (NMP), N,N-dimethylformamide (DMF), N,N-dimethylacetamide (DMAc), or combinations thereof.

The solvent can be spearmint oil, fenchone, and can also be a terpene, such as, for example, but are not limited to, menthol, limonene, d-limonene, limonene oxide, geraniol, α-pinene, α-pinene oxide, thymol, menthone, neomenthol, 3-carene, 1-carvol, carvone, carveol, 1,8-cineole (eucalyptol), citral, dihydrocarveol, dihydrocarvone, 4-terpinenol, fenthone, pulegone, pulegol, isopulegol, piperitone, camphor, α-terpineol, terpinen-4-ol, linalool, carvacrol, trans-anethole, ascaridole, safrole, racemic mixtures thereof, isomers thereof, and mixtures thereof. Thus, the solvent can be an acyclic terpene such as terpene hydrocarbons (e.g. ocimene, myrcene), terpene alcohols (e.g. geraniol, linalool, citronellol), or terpene aldehydes and ketones (e.g. citral, pseudoionone, β-ionone). The solvent can be a monocyclic terpenes, such as terpene hydrocarbons (e.g. terpinene, α-terpinene, terpinolene, limonene), terpene alcohols (e.g. terpineol, thymol, menthol), or terpene ketones (e.g. pulegone, carvone). The solvent can be a bicyclic terpene such as terpene hydrocarbons (e.g. carane, pinane, bornane), terpene alcohols (e.g. borneol, isoborneol), or terpene ketones (e.g. camphor).

The solvent can be alloocimene, alloocimene alcohols, anethole, anisaldeyde, camphene, camphor, 10-camphorsulphonic acid, 3-carene, citral, cintronellal, citronellol, p-cymene, dipentene (p-mentha-1,8-diene), geraniol, 7-hydroxy-dihydrocitronellal, 7-methoxydihydro-citronellal, isoborneol, isobornyl acetate, p-menthan-8-ol, p-menthan-8-yl acetate, menthol, menthone, nopol, ocimene, dihydromycenol, 3,7-dimethyl-1,6-octadiene, pinane, 2-pinane hydroperoxide, pine oil, α-pinene, β-pinene, 2-pinanol, α-terpineol, β-terpineol, γ-terpineol, terpin hydrate, α-terpinyl acetate, and mixtures thereof.

The solvent can be an aqueous solvent, such as water or a mixture of water and an organic solvent, acid, base, and the like.

The HPP can be dissolved in a solvent, such as an organic solvent or an aqueous solvent. An organic solvent can be NMP, DMF, DMAc, a terpene, toluene, spearmint oil, fenchone, or any of the others described in detail above used alone or as a mixture of two or more solvents. The HPP can be dissolved to provide a 1% solution, a 2% solution, a 3% solution, a 4% solution, a 5% solution, a 6% solution, a 7% solution, a 8% solution, a 8% solution, a 10% solution, a 15% solution, a 20% solution, a 25% solution, a 30% solution, a 35% solution, a 40% solution, a 45% solution, a 50% solution, and the like.

The solution of dissolved HPP can be used to bind insoluble particles of a polymer or a HPP. In one aspect, to the solution of dissolved HPP is added a second HPP that is present as a solid and is soluble in the solvent. The resultant mixture can be subjected to conditions such that a paste is obtained. The paste can be molded or extruded to generate objects from HPPs that were cast from non-reconfigurable designs.

The insoluble particles of a polymer or a HPP can have any desired particle size as described in detail above, such as, for example, having an average particle size of about 5 microns to about 250 microns, or about 10 microns to about 100 microns, and the like. The exact particulate dimensions of the materials are not generally critical. However, in certain aspects, the particulate size of the materials may be important. In particular, the particulate size of the materials may be important in those aspects wherein type of printing equipment dictates that either relatively small particle size or larger particle size is desired. For example, the particle size can be important to allow easier flow of the material during molding or extrusion processes.

In another aspect, the particle size of the insoluble particles of a polymer or a HPP can be selected to obtain desired properties of the 3D product. For example, the particle size can be selected that provides for better shape retention, greater cohesiveness, greater strength, greater mechanical or structural integrity, and the like, of the 3D product. In such aspects, the particle size of the insoluble particles can beneficially be smaller, such as 5 microns, 10 microns, 20 microns and the like. According to this aspect, and while not wishing to be bound by any particular theory, it is believed that the small size of the particles provides for the 3D product having better mechanical properties, such as greater strength.

As one of skill in the art will recognize, a correlation can be created between the particle size of the insoluble particles of a polymer or a HPP and the measured properties of the 3D product. Examples of measured properties include, but are not limited to, glass transition temperature (Tg), decomposition temperature, Young's modulus, elastic storage modulus, and the like. The method takes as an input the average particle size of the polymer and the measured mechanical properties of the 3D product. The correlation can then be used to select the particle size for use in the 3D printing method wherein a 3D product with the predetermined mechanical properties can be produced.

In another aspect, to the solution of dissolved HPP is added particles of insoluble HPP, and the resultant mixture can be subjected to conditions such that a viscous solution is obtained. The viscosity of the composition can typically be from about 0.1 centipoise (cp) to about 100 cp, preferably about 1 cp to about 50 cp. The viscosity of the HPP compositions can be adjusted by adding more or less solvent, by selecting the concentration of HPP solution, or any other means known in the art. The viscosity of the composition is such the composition flows thru the extrusion apparatus and at the extrusion temperature.

VI. Molding

The 3-dimensional objects can be formed by a molding process. Thus, the shaping and drying step can comprise operations of casting or molding the HPP compositions in cavities of suitable shape or cross section. The term molding should be taken in its broadest sense and covers any type of conformation, such as casting in an open mold, extrusion through a die and cutting of the extrudate, injection molding (injection compression molding, gas-assisted injection molding and insert molding etc.), blow molding, rotational molding, extrusion molding, press molding, transfer molding, and the like.

The HPP composition can be placed into a mold or extrusion-molding, and a 3D article having a desired shape can be produced. Optionally, a stimulus, such as heat or light can be applied.

VII. Printing

A solution of HPP composition and a powder of a HPP can be used in a process to create three-dimensional articles using a three-dimensional printing system. The HPP composition, as described in detail above, comprises a first HPP dissolved in a solvent and a second HPP present as a solid, wherein the mixture thus obtained is mixed to provide a viscous solution. A three-dimensional printing system can have a computer, a three-dimensional printer, and means for dispensing the HPP powder and the HPP composition. The three-dimensional printing system can optionally contain a post-printing processing system. The computer can be a personal computer, such as a desktop computer, a portable computer, or a tablet. The computer can be a stand-alone computer or a part of a Local Area Network (LAN) or a Wide Area Network (WAN). Thus, the computer can include a software application, such as a Computer Aided Design (CAD)/Computer Aided Manufacturing (CAM) program or a custom software application. The CAD/CAM program can manipulate the digital representations of three-dimensional articles stored in a data storage area. When a user desires to fabricate a three-dimensional article, the user exports the stored representation to a software program, and then instructs the program to print. The program prints each layer by sending instructions to control electronics in the printer, which operates the three-dimensional printer. Alternatively, the digital representation of the article can be directly read from a computer-readable medium (e.g., magnetic or optical disk) by printer hardware.

Typically, a first layer of the HPP solid or powder can be deposited onto a build plate. The deposited HPP solid or powder can be heated to a temperature that is less than about 200° C., and can be in the range of about 30° C. to 170° C., preferably in the range of about 50° C. to about 150° C. The temperature is selected such that it is below that of which polymerization of the HPP occurs, but aids in the polymerization of the HPP when the HPP composition is added. Thus, the deposited HPP solid or powder can be heated to a build temperature of about 40° C., 50° C., 60° C., 70° C., 80° C., 100° C., 110° C., 120° C., 130° C., 140° C., 150° C., 160° C., and the like. The deposited HPP solid or powder can be heated to the desired temperature using any of the known contact or non-contact methods, such as for example, using a heater including, but not limited to, a microwave heater, an infrared heater, an induction heater, a micathermic heater, a solar heater, a heat exchanger, an arc heater, a dielectric heater, a gas heater, a plasma heater, a lamp heater, an infrared heater or any combination thereof, by using a heated plate or a heated roller, or by locally heating the HPP solid or powder using a laser or a laser diode, such as, for example, a scanning carbon dioxide laser.

The first layer of the HPP solid or powder can be deposited onto the build plate using any of the known methods, such as, using a roller, using a scraper, using mechanical means, and the like. Thus, for example, a measured quantity of the HPP solid or powder can be distributed over the build plate to a desired thickness using a roller. In another aspect, the layer of the PEEK powder can have a thickness of about 0.1 nm to less than 500 nm, of about 5 nm to about 250 nm, of about 0.2 nm to about 100 nm, of about 0.3 nm to about 50 nm, of about 0.3 nm to about 25 nm, of about 0.3 nm to about 20 nm, of about 0.3 nm to about 15 nm, of about 0.3 nm to about 10 nm, of about 0.3 nm to about 5 nm, and the like. In yet another aspect, the layer of the PEEK powder can have a thickness of about 10 microns to less than about 500 microns, of about 25 microns to about 250 microns, or of about 50 microns to about 100 microns.

The method of printing a three-dimensional article layer by layer is illustrated in FIG. 1A-1D. In FIG. 1A, the roller 5, deposits HPP solid as a powder from one or more powder bed reservoir 2 to the powder bed 1. The build plate 3 can move in vertical direction as needed. The head 4 prints a HPP composition on the powder bed 1. The HPP composition comprises a HPP dissolved in a solvent. The solvent can be any of the solvents disclosed above, such as, for example, a solvent with a low vapor pressure and is food-safe or GRAS, such as spearmint oil, α-terpinene, limonene, α-pinene, fenchone, and combinations thereof. The HPP composition can be printed onto the powder bed on the build plate by any printing mechanism. For example, printing may comprise inkjet printing, screen printing, gravure printing, offset printing, flexography (flexographic printing), spray-coating, slit coating, extrusion coating, meniscus coating, microspotting, pen-coating, stenciling, stamping, syringe dispensing and/or pump dispensing the activator solution in a predefined pattern.

Figure 1B:
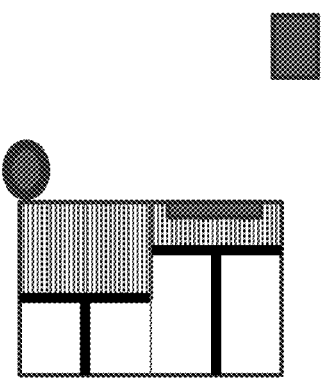

In one aspect, the three-dimensional article can be formed by using a syringe or syringe-like dispenser to print the HPP composition on a build plate, as shown in FIG. 1B. FIG. 1B shows a single layer being patterned. Typically, the syringe deposits a first layer of the HPP composition onto the build plate in a two-dimensional pattern. The syringe, such as Norm-Ject Luer Lock plastic syringes, preferably has a small orifice diameter, thereby enabling the formation of electronic features having a fine minimum feature size. In one aspect, the syringe or other deposition tool includes a deposition orifice having a diameter of not greater than about 200 μm, more preferably not greater than 100 μm, more preferably not greater than 50 μm and even more preferably not greater than about 25 μm. The print speed is dependent on feature size and materials used, and can be easily determined by one of skill in the art and adjusted as desired, and can be between about 1 mm/sec to about 1000 mm/sec, about 5 mm/sec to about 500 mm/sec, about 20 mm/sec to about 100 mm/sec, or about 10 mm/sec to about 50 mm/sec. Thus, the print speed can be between about 5 mm/sec to about 30 mm/sec, or between about 10 mm/sec to about 20 mm/sec.

The printing system can have a printing mechanism for printing a HPP composition onto the HPP solid or powder. For example, printing may comprise inkjet printing, single jet printing, screen printing, gravure printing, offset printing, flexography (flexographic printing), spray-coating, slit coating, extrusion coating, meniscus coating, microspotting, pen-coating, stenciling, stamping, syringe dispensing and/or pump dispensing the HPP solution in a predefined pattern, Thus, the three-dimensional article can be formed by using an ink jet type print cartridge to deposit the HPP composition from the ink jets onto a built plate. Ink jet print heads that can be used in the disclosed methods include MI-15420, MI-12480, MI-12420, and MI-11801, all available from Ricoh Printing Systems America, Inc.

Typically, an ink-jet nozzle prints a two-dimensional pattern of a HPP composition onto the HPP powder bed deposited on a built plate. The printed composition can be contacted with a stimulus wherein the HPP is converted, at least partially, to the final polymer. As described in detail below, the selected stimulus is dependent on the HPP, and can be heat, chemical oxidants, acids, light, electrolysis, metal catalysts, and the like. After a preset period of time that is selected to allow the HPP to partially or fully convert to the final polymer, the next layer of the HPP powder can be deposited to form a powder bed, and the steps repeated. Thus, a 3D article can be manufactured layer by layer.

Optionally, the printed solution can be exposed to a stimulus to form a polymer layer of the three-dimensional article. For example, the stimulus can be heat or a chemical imidization reactant. When the HPP is a ketal, the stimulus can be a Brønsted acid, a Lewis acid, or light. When the HPP is a polysulfide, the stimulus can be an oxidant, such as an organic peroxy acids, an organic peroxides, an inorganic peroxides, or mixtures thereof. When the HPP contain a cross-linking moiety, the stimulus can be light, such as visible light or UV light.

Figure 1C:
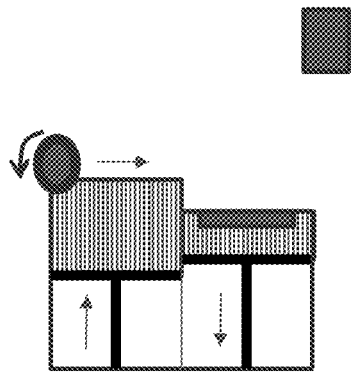
Figure 1D:
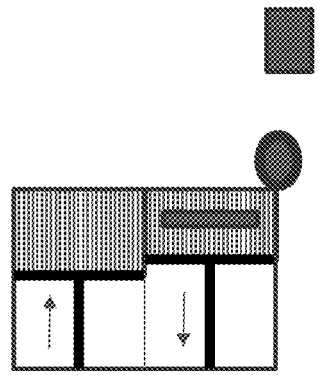

In FIG. 1C, the roller 5, as depositing mechanism, deposits HPP powder from a powder bed reservoir 2 to the powder bed 1. FIG. 1D shows that the HPP powder has formed a new powder bed layer, and the process can be repeated to print a three-dimensional article layer by layer.

In another aspect, the three-dimensional article can be formed by patterning successive layers on a build plate using lithography. The three-dimensional article can be formed by applying a layer of HPP powder to form a powder bed on a build plate. Heating the powder bed to a predetermined temperature. Printing HPP composition on the powder bed through a patterned imaging plate, such as a mask or reticle. The HPP composition can be deposited using any known methods, such as, for example, spraying, by using a syringe, by using an inkjet print head, and the like.

The region that received the jetted HPP composition is allowed to polymerize by maintaining the temperature for the duration of the hold time. Thus, the HPP powder exposed to the HPP composition can be allowed to stay at the hold temperature or the present temperature for about 1 minute to about 2 hours, preferably about 5 minutes to about 30 minutes, more preferably about 8 minutes to about 15 minutes, or from about 1 sec to about 300 sec, preferably about 5 sec to about 30 sec, more preferably about 8 sec to about 15 sec. Thus, the HPP powder exposed to the HPP composition can be allowed to stay on the plate at the hold temperature or the present temperature for hold time of about 7 minutes, about 8 minutes, about 9 minutes, about 10 minutes, about 11 minutes, about 12 minutes, about 13 minutes, about 14 minutes, about 15 minutes, and the like. Without being bound to a theory, the holding period allows volatile components of the fluid, such as the solvent, to evaporate, and the layer to polymerize or at least partially polymerize to form the final polymer. Thus, the holding time is selected such that the HPP can polymerize to the final polymer.

The process is repeated with a new layer of the HPP powder being applied over the top of the previous layer on the build plate. The next cross section of the desired product is then printed with the HPP composition being printed onto the new powder layer.

The previous steps of applying a layer of the HPP powder to the build plate, depositing a solution of activator and allowing it to stay on the build plate at a predetermined temperature and for a predetermined period of hold time are repeated until the final article is completed. The unreacted HPP powder can be removed, if desired, at any time during the process. Thus, a three-dimensional article can be built layer by layer by depositing a series of HPP layers on a build plate to form a powder bed, and printing the HPP composition onto the powder bed.

In another aspect, a HPP composition for use in a process to create three-dimensional articles using a three-dimensional printing system can be deposited onto a build plate, and a stimulus can be printed using the three-dimensional printing system to create the three-dimensional article. The HPP composition, as described in detail above, comprises a first HPP dissolved in a solvent and a second HPP present as a solid, wherein the mixture thus obtained can be deposited onto the build plate as the powder bed. If the stimulus is a photoinitiator, then exposure to light, such as UV light, can be used to create the 3D article.

In another aspect, a HPP powder mixed with stimulus can be deposited onto a build plate, and a stimulus can be printed using the three-dimensional printing system to create the three-dimensional article. A HPP composition comprising a HPP dissolved in a solvent can be printed on the HPP powder deposited onto the build plate. The solvent can be any of the solvents disclosed above, such as, for example, a solvent with a low vapor pressure and is food-safe or GRAS, such as spearmint oil, α-terpinene, limonene, α-pinene, fenchone, and combinations thereof. The HPP composition can be printed onto the powder bed on the build plate by any printing mechanism. If the stimulus is a photoinitiator, then exposure to light, such as UV light, can be used to create the 3D article. Optionally, the three-dimensional printing system can be used to print another stimulus, such as an acid, a base, or a Brønsted acid/base, in a pattern onto the 3D article, thereby further curing selected regions. The process can be used to make 3D articles having heterogeneous parts with differing crosslinked density.

VIII. Curing

The three-dimensional article obtained using the methods and processes described above can be cured to obtain the final three-dimensional article. The curing of the article can be done while it is attached to the build plate, or the curing of the article can be done by separating it from the build plate first and then curing it. In the curing process, the unreacted prepolymer is converted to the final polymer. Thus, for example, if the prepolymer is poly(amic acid), the unreacted poly(amic acid) is converted to the polyimide polymer via imidization during the curing process.

In one aspect, during the curing process, the poly(amic acid) can be converted to a polyimide polymer by dehydration wherein water is eliminated. Imidization to produce the polyimide, i.e. ring closure in the poly(amic acid), can be effected through thermal treatment, chemical dehydration or both, followed by the elimination of a condensate. The polyimide polymer can be produced by a polymerization/imidization reaction according to a known method such as a thermal imidization by heat treatment accompanied by solvent removal and a chemical imidization, for example, by treatment with acetic anhydride accompanied by solvent removal.

In one aspect, chemical imidization can be used to convert the poly(amic acid) to the polyimide. Chemical imidization can be carried out using known agents, such as acetic anhydride; orthoesters, such as, triethyl orthoformate; coupling reagents, such as, carbodiimides, such as dicyclohexylcarbodiimide (DCC) and diisopropylcarbodiimide (DIC), boronic acid, boronic esters, and the like.

In yet another aspect, the curing of compounds such as polyimide and compositions or articles comprising polyimides can be accomplished by curing at elevated temperatures. The curing can be by isothermal heating at a temperature greater than about 190° C., preferably greater than about 250° C., more preferably greater than about 290° C. Thus, the thermal imidization can be carried out at about 280° C., about 290° C., about 300° C., about 310° C., about 320° C., about 350° C., about 375° C., and the like. The curing temperature is selected such that poly(amic acid) is converted to a polyimide and the temperature is below the glass transition temperature or the melting point of the polyimide.

Alternatively, the curing at elevated temperatures can be performed in an isothermal staging process. As an example, such an isothermal staging process can start by heating the material to be cured to 180° C. to 220° C., such as to about 200° C., for some time, typically 1 to 2 hours. However, also less time, such as less than 1 hour, or less than 30 minutes, can be used. Further, also longer times, such as up to 10 hours may be used. Subsequently, the temperature can be increased in steps. Each step may correspond to an increase of the temperature of 10° C. to 50° C. Further, each step may have duration of 30 minutes to 10 hours, such as 1 to 2 hours. The last step may be curing at a temperature of 250 to 400° C., such as at about 300° C. In an isothermal staging process the duration of each isothermal step may decrease as the temperature increases. A further example of an isothermal staging process, is a process starting at 150° C. in which the temperature is increased by 25° C. every hour until 300° C. is reached.

Curing the final product at elevated temperatures can be performed with continuously increasing temperature. Preferably, the heating rate is slow initially but gradually increased as the temperature increases. Thus, for example, the heating process can start at 150° C. and the temperature is increased continuously until 300° C. or above is reached.

The time of heating for thermal imidization can be about 0.1 h to about 48 h, such as 0.5 h to 15 hours, or 0.5 h to 5 h.

The polyimide polymer thus produced has a tensile strength at break of 150 MPa or higher, more preferably 200 MPa or higher, particularly preferably 250 MPa or higher. The tensile strength can be measured using known methods, such by using the Instron Load Frame instruments.

The polyimide polymer thus produced has a tensile modulus of 1.5 GPa or higher, more preferably 2.0 GPa or higher, particularly preferably 2.5 GPa or higher.

The three-dimensional articles prepared using the methods, processes, and systems of the invention are useful in circuit applications, medical applications, transportation applications, and the like. For example the three-dimensional articles can be a printed circuit, an insulator, a medical construct such as an orthotic device, a dental implant, prosthetic sockets, and the like, seal rings, washers, and the like.

EXAMPLES

The examples below are offered for illustrative purposes only, and are not intended to limit the scope of the present invention in any way. Efforts have been made to ensure accuracy with respect to numbers used (e.g., amounts, temperatures, etc.), but some experimental error and deviation should, of course, be allowed for.

Commercial powder PEEK was purchased from Evonik with a diameter of 20 μm or Victrex with a diameter of 50 and utilized as received. Mechanical properties of the prepared PEEK samples were examined by dynamic mechanical analyzer (DMA) 8000 from PerkinElmer. Sinusoidal forces were applied to rectangular samples within linear viscoelastic regions (strain 0.03 mm) under constant frequency (1 Hz for rectangular samples and 10 Hz for crosslinked film samples) as a function of temperature from 24° C. to 270° C. (150° C. for crosslinked films) at 3° C./min. Glass transition temperature ($T_g$) was determined to be a tan(δ) peak. Tensile testing of a dog bone sample (thickness of 3.1 mm and width of 5.2 mm) was performed by Instron 5500R with an extensometer (initial length of 25.4 mm) at a rate of 1 mm/min. Tensile (or Young's) modulus was calculated from the slope in the plot of tensile stress as a function of strain. Differential scanning calorimetry (DSC) studies of the commercial powder PEEK and the synthesized BPA-PEEK were conducted by a TA DSC Q20 calorimeter under nitrogen. Powder samples sealed in aluminum pans were first heated from room temperature to 380° C. at 10° C./min to remove any thermal history in the samples, and cooled to room temperature. Then the samples were second heated to 380° C. at 10° C./min, and heat flow as Watt from this second heating was recorded. Molecular weights of the synthesized BPA-PEEK were determined by gel permeation chromatography (GPC) equipped with three MZ gel 10 μm columns of pore sizes of $10^3$, $10^3$, and $10^5$ Å respectively, a DAWN-HELOS II 18-angle multi-angle laser light scattering detector, and an OptiLab T-rEx refractive index detector from Wyatt Technologies Corporation. THF was used as eluent at a rate of 1 mL/min. The absolute weight average molecular weights were determined by a do/dc value which was measured by assuming the 100% mass recovery of the polymers after passing the columns. Thermogravimetric analysis (TGA) of powder PEEK and BPA-PEEK was conducted by a TA TGA Q50 from room temperature to 800° C. at 10° C./min.

Example 1

Synthesis of High Molecular Weight BPA-PEEK Polymers
PEEK polymer having the following structure:

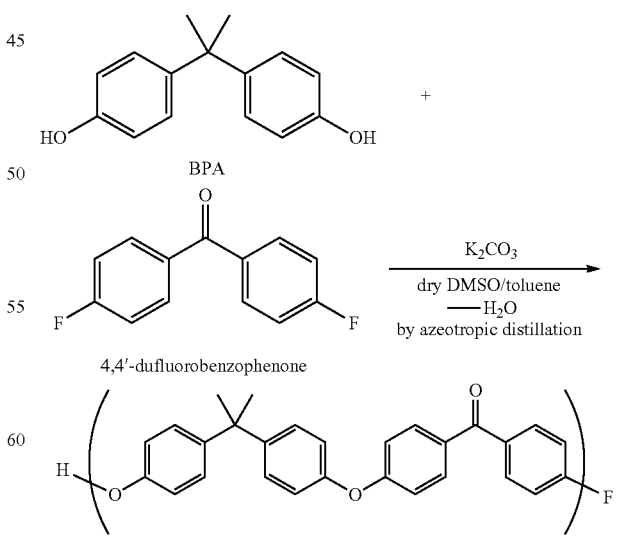

was synthesized. Bisphenol A (BPA, 11.46 g, 50 mmol), 4,4'-difluorobenzophenone (10.91 g, 50 mmol), and potassium carbonate (7.6 g, 55 mmol) were mixed in 100 mL of dry DMSO and 50 mL of dry toluene in a three neck flask connected with a $N_2$ gas inlet and Dean Stark trap with a condenser. This mixture was stirred in an oil bath at 150° C. (up to 160° C.) for 2 h, and then 170° C. (up to 180° C.) for 15 h (to 24 h). As polymerization proceeded, a solid product precipitated. The solution was cooled to room temperature, and the solvent was decanted to provide the solid product. The solid product was purified by dissolving the solid product in DCM (~200 mL), and adding cold methanol in an ice bath to precipitate the polymer solid. The resulting solid was washed with water to remove any remaining $K_2CO_3$ and filtered. For further purification, after drying, the solid product was dissolved in and adding cold methanol in an ice bath to precipitate the polymer solid. The polymer solid was air dried to provide a lightly brown to tan solid as a final product (21 g, 94% yield).

Example 2

Synthesis of Polymers Comprising an Alkene Moiety
PEEK polymer having the following structure:

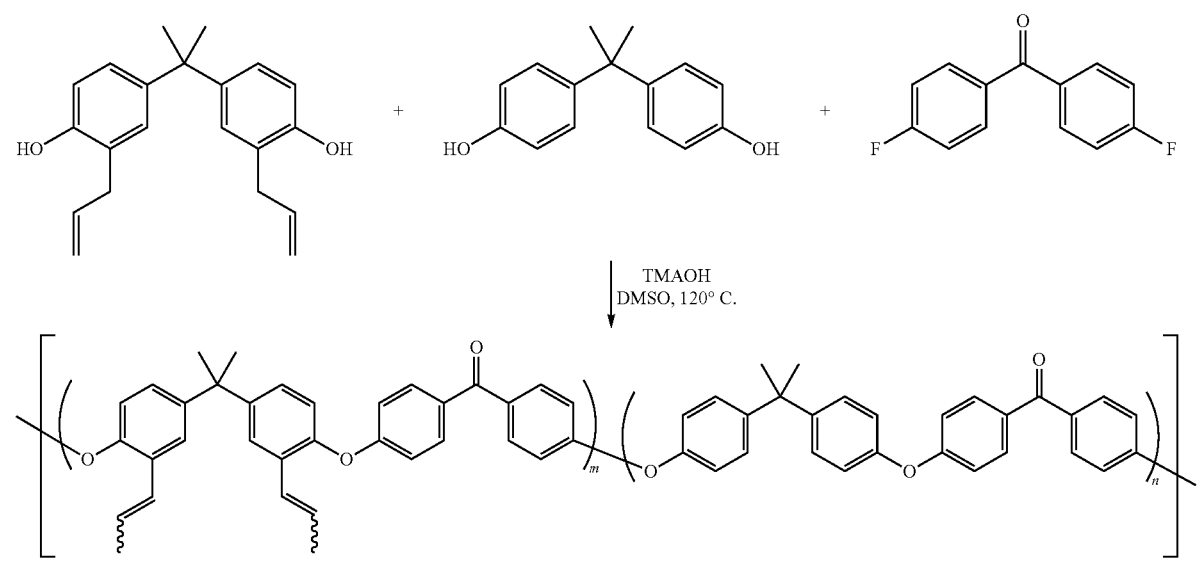

was synthesized. To a 100 mL flask was added 4,4'-difluorobenzophenone (3.30 g, 15.12 mmol), bisphenol A (1.72 g, 7.53 mmol), 2,2'-diallyl bisphenol A (2.33 g, 7.55 mmol) and DMSO (30 mL). The suspension was heated to 50° C. until all solids dissolved. To this solution was added tetramethylammonium hydroxide pentahydrate (5.54 g, 30.57 mmol) and the reaction temperature increased to 120° C. After 90 minutes, the reaction was cooled to room temperature and the liquid decanted. The remaining solids were dissolved in dichloromethane and precipitated into methanol to give the alkene-containing PEEK (4.69 g, 70% yield). Analysis by $^1$H-NMR spectroscopy showed a ~1:1 ratio of BPA:diallyl BPA units.

Example 3

Synthesis of Polymers Comprising an Epoxide Moiety:

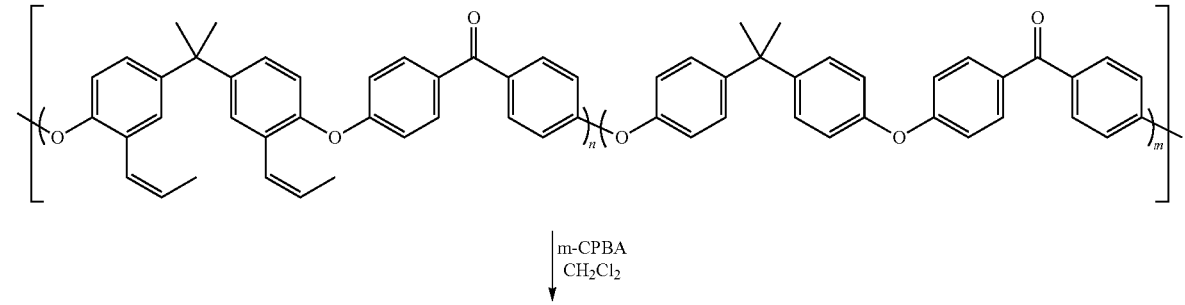

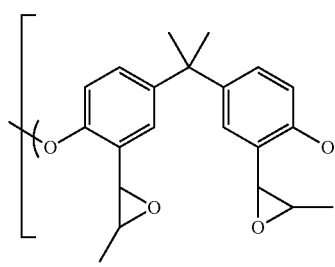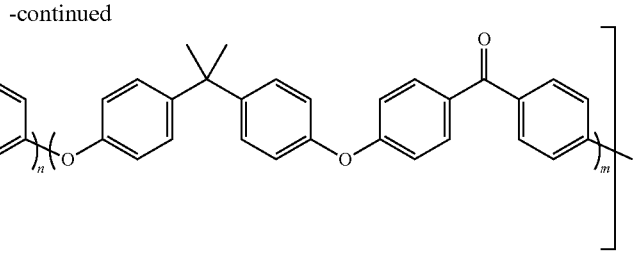

To a solution of the alkene-containing PEEK prepared in Example 1 (4.69 g, 10.51 mmol) in dichloromethane (75 mL) was added m-CPBA (5.21 g, 21.13 mmol). After stirring for 2 hours, the polymer was precipitated into methanol to give the epoxy-PEEK polymer (4.23 g, 87% yield). GPC analysis showed $M_n$=21.6 KDa; $M_w$=39.4 KDa; $Đ$=1.82.

Example 4

Photo-Crosslinking of Epoxy-PEEK in Spearmint Oil:

The epoxy-PEEK polymer prepared in Example 2 was dissolved in spearmint oil to provide a 7 weight % epoxy-PEEK solution. The control experiment did not have the epoxy-PEEK polymer present. To the epoxy-PEEK solution was added triarylsulfonium photoinitiator at either 1 weight % or 8 weight %, para-toluenesulfonic acid (PTSA) at either 0, 0.1, Or 0.1 weight %, fluoroantimonic acid hexahydrate ($HSbF_6 \cdot 6H_2O$) at 0 or 1 weight %, and trifluoroacetic acid (TFA) at 0 or 1 weight %. Approximately 0.3 mL of the solution was deposited onto a glass slide and either exposed to UV light or not exposed to UV light using a 100-W lamp with emission wavelength of 365 nm. The time required for the material to harden and become free-standing when removed from the glass slide was recorded. The data is summarized in Table 1.

TABLE 1

Cure time for cross-liking of epoxy-PEEK in spearmint oil as the solvent.

| entry | epoxy-PEEK (wt %) | photo-initiator (wt %) | pTSA (wt %) | $HSbF_6 \cdot 6H_2O$ | TFA | UV | Cure Time (min) |
|---|---|---|---|---|---|---|---|
| 1 | 7 | — | 1 | — | — | off | — |
| 2 | 7 | — | — | 1 | — | off | 1 |
| 3 | 0 | — | — | 1 | — | off | — |
| 4 | 7 | — | — | — | 1 | off | — |
| 5 | 7 | 1 | — | — | — | on | — |
| 6 | 7 | 1 | 1 | — | — | on | 7 |
| 7 | 7 | 1 | — | 1 | — | on | 1 |
| 8 | 7 | 1 | — | — | 1 | on | 7 |

The results showed that addition of an acid in the absence of a photo-initiator was not effective in reducing the cure time. The data in Table 1 shows that pTSA alone was not affective (entry 1), nor was TFA (entry 4). However, when $HSbF_6 \cdot 6H_2O$ was used, cure time of 1-minute was observed even in the absence of the photo-initiator (entry 2). Furthermore, the combination of acid and photo-initiator in spearmint oil was more effective than either activating agent alone. For example, neither the photo-initiator/UV light nor pTSA individually led to curing of the epoxy-PEEK, but when combined (entry 6) a successful 7-minute cure time was observed. Similar synergistic effect was observed from TFA with the photo-initiator (entry 8). The combination of $HSbF_6 \cdot 6H_2O$ with the photo-initiator (entry 7) had about the same cure time as the use of $HSbF_6 \cdot 6H_2O$ alone (entry 2).

Example 5

Photo-Crosslinking of Epoxy-PEEK in Terpene Solvents:

The photo-crosslinking of epoxy-PEEK polymer in terpinene solvents was performed as detailed in Example 4, except the solvent was spearmint oil and a terpene. The time required for the material to harden and become free-standing when removed from the glass slide was recorded. The data is summarized in Table 2.

TABLE 2

Cure time for cross-liking of epoxy-PEEK in mixture of spearmint oil and a terpene as the solvent.

| entry | solvent | epoxy-PEEK (wt %) | photo-initiator (wt %) | pTSA (wt %) | $HSbF_6 \cdot 6H_2O$ | TFA | UV | Cure Time (min) |
|---|---|---|---|---|---|---|---|---|
| 1 | α-terpinene/spearmint oil (1:1.2 v/v) | 7 | 1 | — | — | — | yes | 30 |
| 2 | | 7 | 8 | — | — | — | yes | 10 |
| 3 | limonene/spearmint oil (1:1.3 v/v) | 7 | 1 | — | — | — | yes | 15 |
| 4 | | 7 | 8 | — | — | — | yes | 5 |
| 5 | α-pinene/spearmint oil (1:1.9 v/v) | 7 | 1 | — | — | — | yes | 30 |
| 6 | | 7 | 8 | — | — | — | yes | 15 |

The results showed that addition of a terpene as a co-solvent reducing the cure time when compared to spearmint oil as the solvent. The use of α-terpinene, limonene, and α-pinene as co-solvents (entries 1-6) with spearmint oil each gave better results than using spearmint oil alone (Table 1, entry 5, no curing observed). The low polarity of the co-solvents necessitated some spearmint oil to dissolve the epoxy-PEEK at 7 wt %. Increasing the wt % of photo-initiator from 1 to 8 wt % was observed to reduce the cure time for each of the three solvent mixtures.

Example 6

Photo-Crosslinking of Epoxy-PEEK in Fenchone:

The photo-crosslinking of epoxy-PEEK polymer in fenchone as the solvent was performed as detailed in Example 4. The time required for the material to harden and become free-standing when removed from the glass slide was recorded. The data is summarized in Table 3.

TABLE 3

Cure time for cross-liking of epoxy-PEEK in fenchone as the solvent.

| entry | epoxy-PEEK (wt %) | photo-initiator (wt %) | pTSA (wt %) | HSbF$_6$·6H$_2$O | TFA | UV | Cure Time |
|---|---|---|---|---|---|---|---|
| 1 | 7 | — | 1 | — | — | off | — |
| 2 | 7 | — | — | 1 | — | off | 30 sec |
| 3 | 0 | — | — | 1 | — | off | — |
| 4 | 7 | — | — | — | 1 | off | — |
| 5 | 7 | 1 | — | — | — | on | 15 sec |
| 6 | 7 | 1 | 1 | — | — | on | 30 sec |
| 7 | 7 | 1 | — | 1 | — | on | 30 sec |
| 8 | 7 | 1 | — | — | 1 | on | 1 min |

Fenchone is a food-safe solvent that has the polar carbonyl functional group but lacks the α,β-unsaturation that could lead to reactions with radical species. The data show that the use of fenchone as the solvent results in much shorter cure time compared with spearmint oil and solvent system where a mixture of spearmint oil and a terpene was used. Specifically, cure time of 30-second was observed when HSbF$_6$·6H$_2$O was used even without the photo-initiator (entry 2). Even more rapid 15-second cure times were observed when the photo-initiator was used (entry 5). The use of a photo-initiator and an acid (entries 6, 7, and 8) did not increase the cure time to less than 30 sec. However, the data in Table 3 shows that the use of fenchone as the solvent for cross-linking provides much faster cure times.

Example 7

Figure 2A:
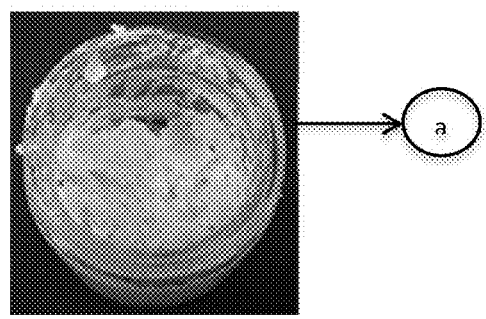
FIG. 2A-2D illustrates the procedure for preparing a rectangular 3D product by molding a paste of powder PEEK and BPA-PEEK solution.
Figure 2B:
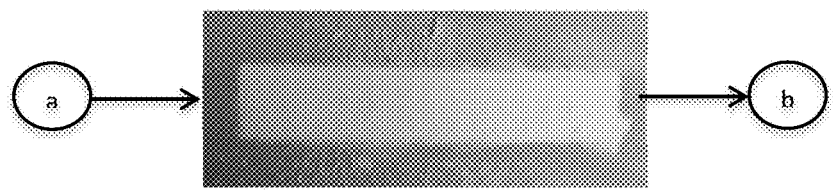
Figure 2C:
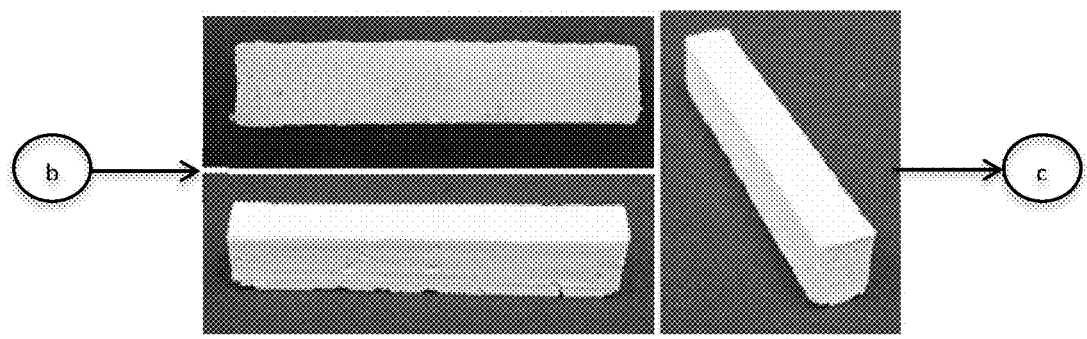
Figure 2D:
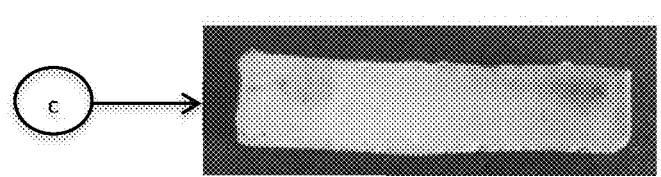

Preparation of Model Products Using PEEK Polymer:

The BPA-PEEK polymer prepared in Example 1 was dissolved in spearmint oil to provide a 6 weight % to 8 weight % BPA-PEEK solution. To 2 mL of the BPA-PEEK solution was added powder PEEK (1 g, purchased from Evonic) with a diameter of approximately 20 μm, and the mixture was stirred overnight at room temperature to provide a paste (semi-solid, FIG. 2A). The paste was molded to rectangular shapes (or a dog bone shape) of crosslinked polysiloxane (3.8 mm (T)×5.7 mm (W)×28.6 mm, FIG. 2B). The molded shape placed in an oven, and the temperature was increased at a rate of about 0.5° C./min to 120° C. (range from 100° C. to 150° C.) to prevent any cracking from fast heating to high temperature. After heating for 3 h, the rectangular product cast in the mixture of PEEK powder and BPA-PEEK was removed from the mold (FIG. 2C). The casted product was further dried at 220° C. for 3 h to remove any remaining solvent. The dried product was baked at high temperature by two methods as follows. In the first method, the dried product was baked at 332° C. (temperature range: up to 345° C.), which is below the melting temperature of the powder PEEK (345° C.), for 2 to 3 h. In the second method, the dried product was baked them above 360° C., above the melting temperature of the powder PEEK, for a short period time (i.e. 5 mins). The samples were heated from 220° C. to 365° C. (temperature range: 360° C. to 380° C.) at the rate of about 7° C./min, and kept at 365° C. for 5 mins (up to 20 mins depending on the size of samples) and cooled to room temperature (FIG. 2D). The product baked by the second method (baked above 360° C.) should be cooled to 150° C. slowly (for at least one hour) to minimize any distortion or bending of the sample. If the bottom side of the rectangles was not fully melted and the sample was bent, the sample was reversed up to down and baked at 365° C. for additional 5 mins. After baking at 365° C., the dimensions of the sample were reduced to 2.9 mm×5.0 mm×22.4 mm.

Figure 3A:
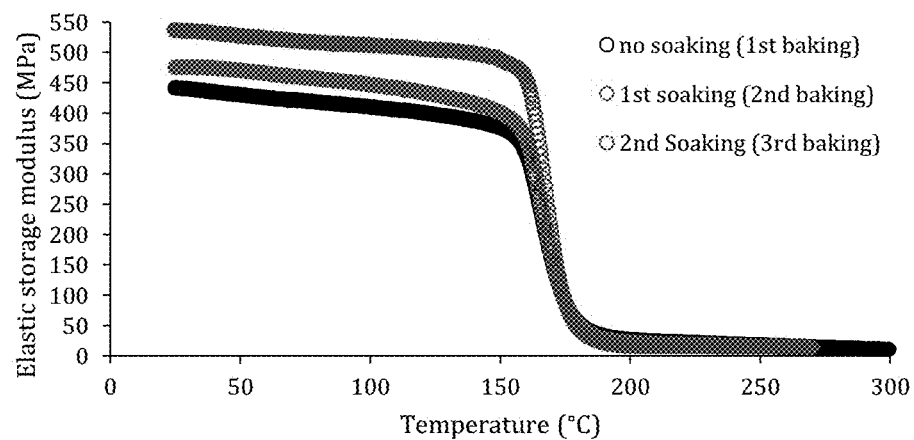
FIG. 3A-3B illustrates the dynamic mechanical analysis (DMA) of three-dimensional product after each soaking and baking cycle.
Figure 3B:
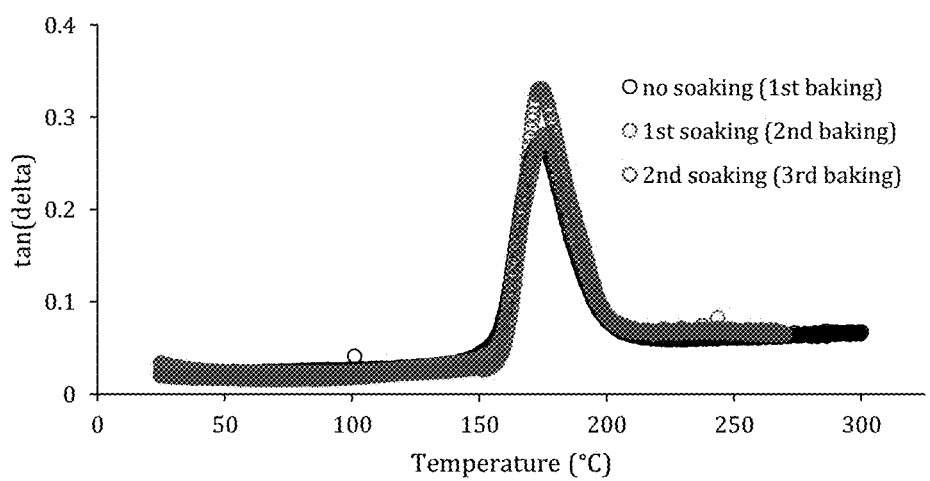

To study the effect of soaking on the mechanical properties of the PEEK samples, the first baked, rectangular sample after DMA experiment was immersed into the PEEK solution in spearmint oil (6 weight % or 8 weight %) for 30 mins. The sample was dried in the air at room temperature, and further dried in a heating oven at 220° C. for 2 hrs. Then the sample was baked at 365° C. for 5 mins. This procedure is called "1$^{st}$ soaking and 2$^{nd}$ baking" in this study. This sample was examined by DMA. The area of the rectangular sample for DMA experiment kept identical. Then the same sample after DMA was immersed in the PEEK solution, dried and baked under the identical conditions, which is call "2$^{nd}$ soaking and 3$^{rd}$ baking." The results are shown in FIG. 3A-3B. Additional soaking and baking cycles showed an increase in the elastic storage modulus (E') of 535 MPa, however, additional soaking and baking cycles did not improve E' (FIG. 3A). In addition, the glass transition temperature, Tg, was not changed by the soaking and baking cycles (FIG. 3B).

Example 8

Preparation of 3D PEEK Products by Syringe Printing:

The BPA-PEEK polymer prepared in Example 1 was dissolved in spearmint oil to provide a 6 weight % BPA-PEEK solution. To 7.6 mL of the BPA-PEEK solution was added powder PEEK (2.5 g, purchased from Evonic) with a diameter of approximately 20 μm and the mixture was stirred overnight at room temperature to provide viscous mixture of powder PEEK and BPA-PEEK solution.

Figure 4A:
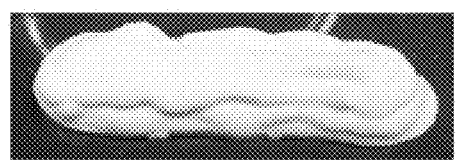
FIG. 4A-4B illustrates 3D products manufactured by syringe printing a powder PEEK and BPA-PEEK solution.
Figure 4B:
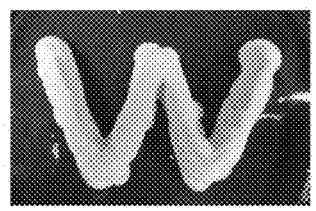

Using a 1 mL syringe, this mixture was printed on a glass slide at room temperature or a glass slide heated to around 50° C. by placing it on a hot plate. Multiple layers were added on the printed areas. In some cases, up to 10 layers were added. The printed samples were dried on a hot plate for at least 3 h. FIG. 4A shows a multiple-layered 3D log-like structure, while FIG. 4B shows the letter "W" having multiple layers, both prepared by the method described above.

Example 9

Preparation of 3D PEEK Products Using Different Particle Sizes:

The BPA-PEEK polymer prepared in Example 1 and having high molecular weight (Mw=121 kDa) was dissolved in spearmint oil to provide a 8 weight % BPA-PEEK solution. To 2 mL of the BPA-PEEK solution was added powder PEEK (2.5 g, purchased from Evonic) with a diameter of approximately 20 μm or approximately 50 and the mixture was stirred overnight at room temperature to provide a paste. As described in Example 4, the paste was molded to rectangular shapes. The molded shape were removed from the mold and placed in an oven, and the temperature was increased at a rate of about 0.5° C./min to 120° C. (range from 100° C. to 150° C.). After heating for 3 h, the casted product was further dried at 220-230° C. to remove any remaining solvent. The dried product was baked at 370-385° C., above the melting temperature of the powder PEEK, for a short period time (i.e. 5-20 mins), and then cooled to 150° C. slowly to minimize any distortion or bending of the sample.

Figure 5:
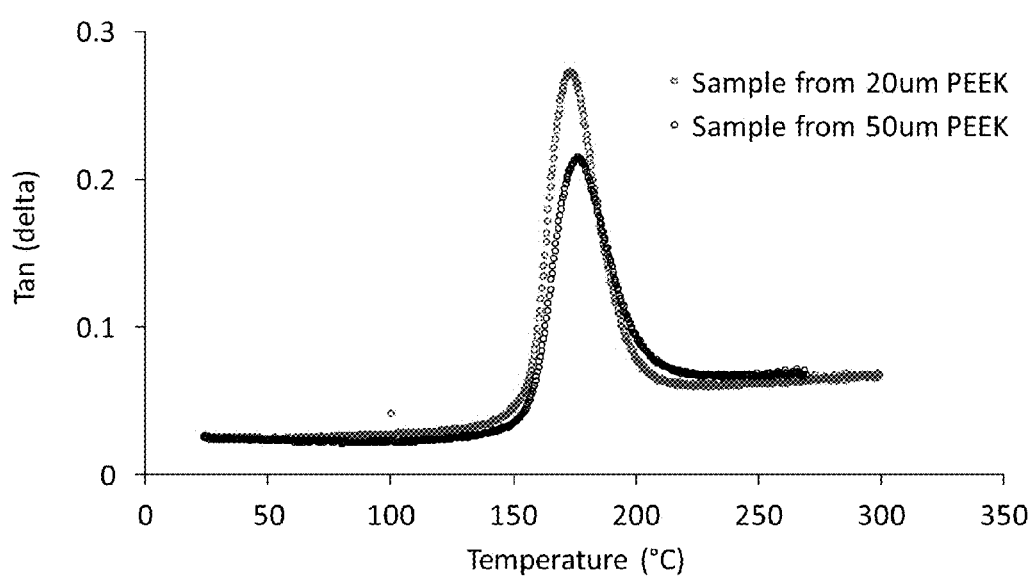
FIG. 5 illustrates dynamic mechanical analysis (DMA) of three-dimensional products made using smaller particle size PEEK polymer and one made using larger particle size PEEK polymer.

The 3D product thus obtained using high molecular weight PEEK and different particle size was analyzed by DMA. The glass transition temperature (Tg) was determined from a plot of temperature versus Tan(delta) (FIG. 5). The 3D products produced above using either approximately 20 μm or approximately 50 μm particle size had Tg values of 174-177° C. For comparison, Tg for commercial PEEK samples from Victrex was determined to be 183° C. The results indicate that strength of the 3D product can be varied by selecting the appropriate particle size of the polymers. In addition, the green body objects obtained using the 20 μm PEEK were more robust. Thus, a particle size can be selected that provides a 3D product with the desired mechanical properties.

Figure 6:
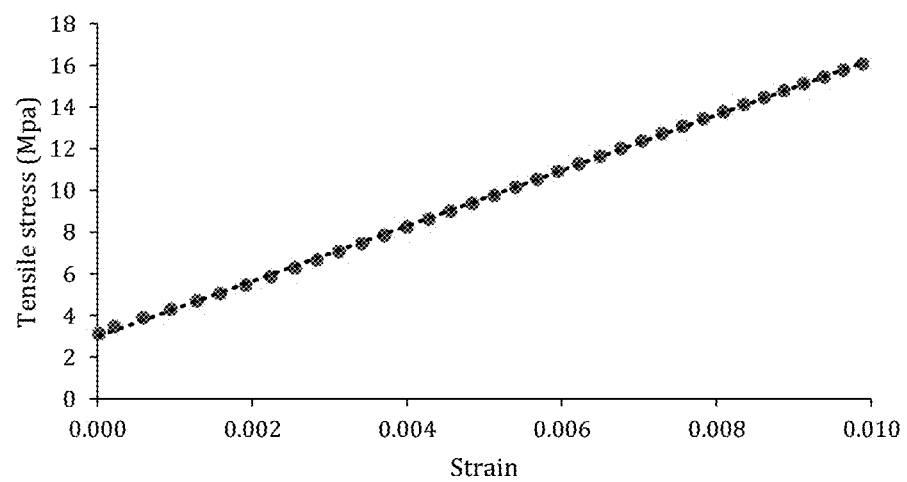
FIG. 6 illustrates the stress-strain plot of the three-dimensional product.

The 3D product made using 20 μm polymer was tested using an Instron load frame to determine the Young's modulus and tensile stress at break. The results are shown in FIG. 6. The slope of the stress-versus-strain gives a Young's modulus of 1.33 GPa. The tensile stress at break was found to be 29.6 MPa. In comparison, the tensile strength for commercial PEEK is typically 90-100 MPa.

Example 10

Preparation of 3D PEEK Products by Jetting of Epoxy-PEEK in Fenchone:

Based on the measured viscosity profile, we proceeded to perform initial experiments to jet the solution of epoxy-PEEK and UV photoinitiator using the Gen4L head. With the Gen4L head temperature set at 65° C., the solution was successfully jetted onto a microscope slide. The microscope slide onto which we jetted the fenchone solution was placed under an UV lamp and cured to a gel in under 1 minute. The gel hardened to a solid as a result of ongoing exposure to ambient room lighting. It should be noted that when printing with the fenchone solution, we observed issues of solvent penetrating the silicone tubing, just as it did when using carvone as solvent. However, the approaches found when working with the carvone solutions work again in this case. Teflon tubing can be used if flexibility is not required. For tubing attached to a moving print head, flexibility is important and therefore the alternate solution of sealing the tubing with silicone grease (possible with a protective outer layer of tubing) is being evaluated.

Example 11

Figure 7:
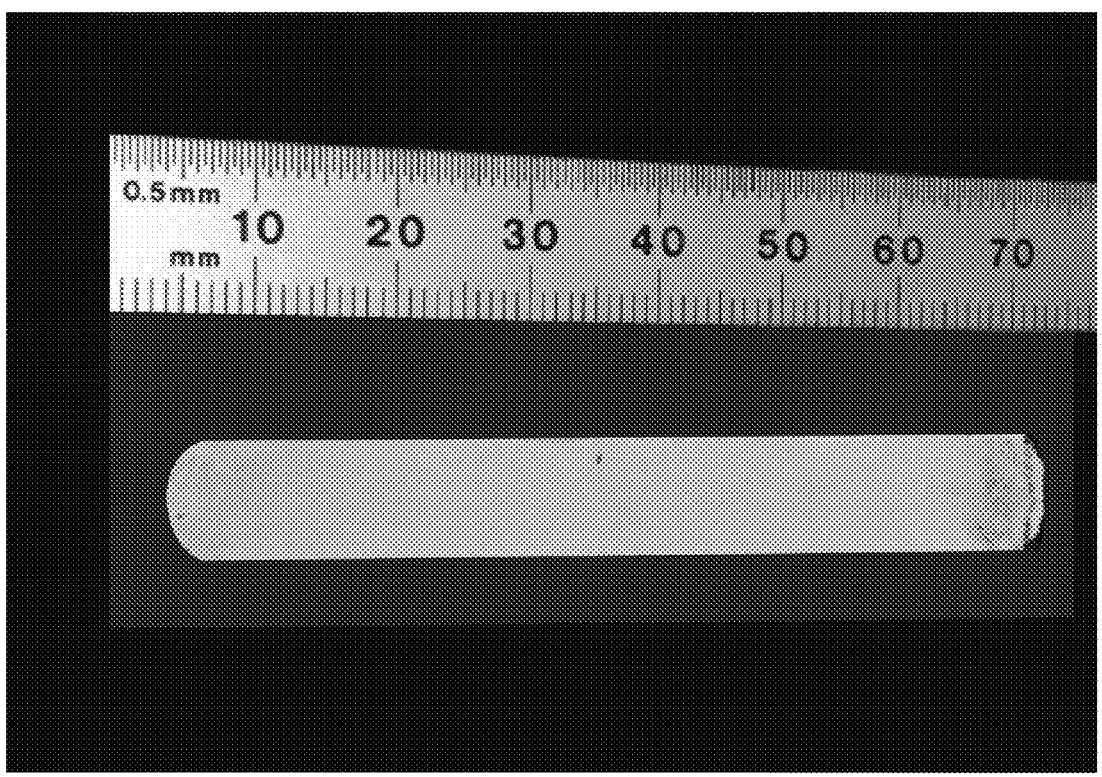
FIG. 7 illustrates a 3D product manufactured using PEEK powder and bound with UV activated fenchone solution of epoxy-PEEK and photoinitiator.

Preparation of 3D PEEK Products by Combination of Epoxy-PEEK in Fenchone with PEEK Powder:

PEEK powder was deposited on a base, then fenchone solution of epoxy-PEEK and photoinitiator was added, and the layer was exposed to the UV light source for about 1 minute. The process was repeated to create a 2-layer specimen. We found that the UV curing provided additional stability to the specimen. The resulting 3D PEEK product is show in FIG. 7.

While the invention has been particularly shown and described with reference to a preferred embodiment and various alternate embodiments, it will be understood by persons skilled in the relevant art that various changes in form and details can be made therein without departing from the spirit and scope of the invention. All printed patents and publications referred to in this application are hereby incorporated herein in their entirety by this reference.

We claim:

1. A method of manufacturing a three-dimensional article, the method comprising:
   depositing a high-performance polymer (HPP) composition comprising:
      a homogenous mixture of a first HPP dissolved in a solvent; and
      a second HPP that is insoluble in the solvent;
      exposing the HPP composition to a stimulus to form a polymer layer of the three-dimensional article; and
      repeating the steps (a)-(b) to form remainder of the three-dimensional article;
   wherein the solvent comprises spearmint oil, α-terpinene, limonene, α-pinene, fenchone, or combinations thereof.

2. The method of claim 1, wherein the first HPP comprises a polyketone.

3. The method of claim 2, wherein the polyketone comprises polyetheretherketone (PEEK), polyaryletherketone (PAEK), polyetherketone (PEK), polyetherketoneketone (PEKK) polyetheretheretherketone (PEEEK), polyetheretherketoneketone (PEEKK), polyetherketoneetheretherketone (PEKEKK), or polyetherketoneketoneketone (PEKKK).

4. The method of claim 1, wherein the second HPP comprises polyimides, polyketones, reduced forms of polyketones, or polyethersulfones, and wherein the second HPP is not soluble in the solvent.

5. The method of claim 1, wherein the stimulus comprises heat, light, oxidation, reduction, acid catalysis, base catalysis, transition metal catalysis, or combination thereof.

6. The method of claim 1, further comprising the step of curing wherein curing is done by chemical curing or thermal curing.

7. A method for manufacturing a three-dimensional article, the method comprising:
   depositing a powder of first HPP on a build plate to form a powder bed;
   printing a solution comprising a homogeneous mixture of a second HPP dissolved in a solvent at selected locations on the powder bed;
   exposing the printed solution to a stimulus to form a polymer layer of the three-dimensional article; and
   repeating steps (a)-(c) to manufacture remainder of the three-dimensional article.

8. The method of claim 7, wherein the first HPP comprises polyimides, polyketones, reduced forms of polyketones, or polyethersulfones, and wherein the first HPP is not soluble in the solvent.

9. The method of claim 7, wherein the second HPP comprises a polyketone.

10. The method of claim 9, wherein the polyketone comprises polyetheretherketone (PEEK), polyaryletherketone (PAEK), polyetherketone (PEK), polyetherketoneketone (PEKK) polyetheretheretherketone (PEEEK), polyetheretherketoneketone (PEEKK), polyetherketoneetherketone (PEKEKK), or polyetherketoneketoneketone (PEKKK).

11. The method of claim 7, wherein the solvent has a low vapor pressure and is food-safe.

12. The method of claim 11, wherein the solvent comprises spearmint oil, α-terpinene, limonene, α-pinene, fenchone, or combinations thereof.

13. The method of claim 7, wherein the stimulus comprises heat, light, oxidation, reduction, acid catalysis, base catalysis, transition metal catalysis, or combination thereof.

14. The method of claim 7, further comprising the step of curing wherein curing is done by chemical curing or thermal curing.

15. A three-dimensional article made by the process of:
depositing a high-performance polymer (HPP) composition comprising:
a homogeneous mixture of a first HPP dissolved in a solvent; and
a second HPP that is insoluble in the solvent;
exposing the HPP composition to a stimulus to form a polymer layer of the three-dimensional article;
repeating the steps (a)-(b) to form remainder of the three-dimensional article; and
curing the article for less than about 1 minute;
wherein the solvent comprises spearmint oil, α-terpinene, limonene, α-pinene, fenchone, or combinations thereof.

16. The method of claim 15, wherein the first HPP comprises a polyketone, wherein the polyketone comprises polyetheretherketone (PEEK), polyaryletherketone (PAEK), polyetherketone (PEK), polyetherketoneketone (PEKK) polyetheretheretherketone (PEEEK), polyetheretherketoneketone (PEEKK), polyetherketoneetheretherketone (PEKEKK), or polyetherketoneketoneketone (PEKKK), wherein the second HPP comprises polyimides, polyketones, reduced forms of polyketones, or polyethersulfones, and wherein the second HPP is not soluble in the solvent.

17. The method of claim 15, wherein the stimulus comprises heat, light, oxidation, reduction, acid catalysis, base catalysis, transition metal catalysis, or combination thereof.

* * * * *